US011534021B2

(12) United States Patent  
Hanes et al.

(10) Patent No.: US 11,534,021 B2  
(45) Date of Patent: Dec. 27, 2022

(54) METHODS FOR MEASURING USAGE OF CONSUMABLES IN KITCHEN APPLIANCES

(71) Applicant: Hamilton Beach Brands, Inc., Glen Allen, VA (US)

(72) Inventors: Adam Hanes, Glen Allen, VA (US); Patrick T Mulvaney, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 132 days.

(21) Appl. No.: 16/656,611

(22) Filed: Oct. 18, 2019

(65) Prior Publication Data

US 2020/0129004 A1 Apr. 30, 2020

Related U.S. Application Data

(60) Provisional application No. 62/766,604, filed on Oct. 31, 2018.

(51) Int. Cl.
| | |
|---|---|
| *A47J 31/52* | (2006.01) |
| *A23F 5/24* | (2006.01) |
| *A47J 31/06* | (2006.01) |
| *A47J 37/08* | (2006.01) |
| *A47J 36/32* | (2006.01) |

(52) U.S. Cl.  
CPC ............... *A47J 31/521* (2018.08); *A23F 5/24* (2013.01); *A47J 31/0642* (2013.01); *A47J 36/321* (2018.08); *A47J 37/08* (2013.01)

(58) Field of Classification Search  
CPC ..... A47J 31/0642; A47J 31/521; A47J 36/321; A47J 37/08; A23F 5/24  
See application file for complete search history.

(56) References Cited

U.S. PATENT DOCUMENTS

| | | | | |
|---|---|---|---|---|
| 2006/0090653 | A1* | 5/2006 | McDuffie | A47J 31/52 99/279 |
| 2012/0173357 | A1* | 7/2012 | Yoakim | A47J 31/4403 705/26.1 |
| 2012/0240781 | A1* | 9/2012 | Delbreil | G07F 9/0235 99/285 |
| 2012/0245732 | A1* | 9/2012 | Yoakim | A47J 31/5251 700/244 |
| 2012/0253993 | A1* | 10/2012 | Yoakim | A47J 31/5253 705/27.2 |

(Continued)

*Primary Examiner* — Anthony J Weier  
(74) *Attorney, Agent, or Firm* — Alexander D. Raring

(57) ABSTRACT

Automated replenishment of consumables is a growing area of interest for customers and businesses alike, in that it has the potential to both improve customer satisfaction and create a steady stream of orders for a consumable service or product. As recognized herein, kitchen appliances, including those for dispensing beverages, present specific challenges to integration with a replenishment service, especially where multiple packages or formats of consumables may be utilized by a single kitchen appliance. Aspects provided herein include methods, systems, and devices for tracking consumption of foodstuffs prepared by a kitchen appliance, including either counting discrete quantities of foodstuffs or estimating non-discrete quantities. A signal requesting replenishment of at least one foodstuff may be transmitted to a replenishment server based on the counting and/or estimating.

11 Claims, 9 Drawing Sheets

(56) References Cited

U.S. PATENT DOCUMENTS

| | | | | |
|---|---|---|---|---|
| 2013/0220134 A1* | 8/2013 | Giua | ............... | A47J 31/525 |
| | | | | 99/280 |
| 2014/0013958 A1* | 1/2014 | Krasne | ............... | A47J 31/407 |
| | | | | 99/284 |
| 2014/0120223 A1* | 5/2014 | Boubeddi | ............... | A47J 31/407 |
| | | | | 426/416 |
| 2014/0314921 A1* | 10/2014 | Kuempel | ............... | A47J 31/5255 |
| | | | | 426/231 |
| 2015/0114235 A1* | 4/2015 | Schwarz | ............... | A47J 31/057 |
| | | | | 99/295 |
| 2016/0037962 A1* | 2/2016 | Pennington | ............... | A47J 31/465 |
| | | | | 426/231 |
| 2016/0038525 A1* | 2/2016 | Broedl | ............... | A61K 31/7048 |
| | | | | 514/23 |
| 2017/0099983 A1* | 4/2017 | Hanes | ............... | A47J 31/465 |
| 2017/0135514 A1* | 5/2017 | Caputa | ............... | A47J 31/446 |
| 2018/0177331 A1* | 6/2018 | Flick | ............... | A47J 31/4492 |
| 2018/0357597 A1* | 12/2018 | Magatti | ............... | G06Q 10/087 |
| 2019/0045966 A1* | 2/2019 | Shi | ............... | A47J 31/06 |
| 2020/0109042 A1* | 4/2020 | Jacobsen | ............... | A47J 31/521 |
| 2021/0000283 A1* | 1/2021 | Burrows | ............... | A47J 31/4492 |

\* cited by examiner

METHODS FOR MEASURING USAGE OF CONSUMABLES IN KITCHEN APPLIANCES

CROSS-REFERENCE TO RELATED APPLICATION

The present application claims priority under 35 U.S.C. § 119 to U.S. Provisional Application No. 62/766,604, filed on Oct. 31, 2018, with the United States Patent and Trademark Office, the entire contents of which are hereby incorporated by reference for all purposes.

TECHNICAL FIELD

The present disclosure relates generally to kitchen appliances, including kitchen appliances used in preparing beverages. Some of the subject kitchen appliances can be operated in a plurality of types of brewing modes, based on user preference. More specifically, the present disclosure provides methods, systems, and devices for measuring usage of consumables in kitchen appliances, including kitchen appliances used in preparing beverages.

BACKGROUND

Kitchen appliances, including kitchen appliances used in preparing beverages, are well known. It has been recognized previously that some such kitchen appliances have numerous disadvantages. For example, some kitchen appliances that prepare beverages exclusively use a cartridge or capsule-based system (such as cartridge brewers, etc.) that employs mechanical air or liquid pumps, while other kitchen appliances that prepare beverages exclusively use non-cartridge-based system (e.g., percolators, automatic drip coffeemakers, etc.). Only recently have beverage-preparing machines capable of operating in both conditions during different brew or heating cycles have been developed. Such machines are disclosed in, for example, U.S. patent application Ser. No. 15/298,814, which has been published as U.S. Pre-Grant Publication No. 2017/0035241, which is incorporated by reference herein in its entirety for all purposes.

Such beverage-preparing machines having "dual-mode" brewing systems provide convenience and flexibility for users to purchase and use consumables in different formats. A kitchen appliance having multiple brewing mechanisms may be more versatile, because it may allow a user to create a beverage from foodstuff in any one of a variety of different forms or states. For example, the beverage-preparing kitchen appliance having multiple brewing mechanisms may be used to make coffee or tea from loose coffee grounds or leaves, coffee grounds or leaves contained in a generally soft packet (i.e., a flexible coffee "pod" or a tea bag), or coffee grounds or tea leaves contained in a generally hard container (i.e., a rigid coffee or tea "cup" or "pod").

Relatedly, there are a number of kitchen appliances (e.g., toasters, waffle makers, slow cookers, blenders, juicers, crock pots, pressure cookers, or the like) that may accept either discrete quantity foodstuffs (such as pieces of toast, frozen waffles, toaster pastries, whole unbroken eggs, and so on), and/or foodstuffs that are various and non-discrete quantities (e.g., liquids, batters, doughs, uncooked and scrambled eggs, and so on). These foodstuffs may be purchased for consumption.

Separately, there has been a consumer-driven movement to increase the technological sophistication of devices used in residential and commercial environments, to leverage computing devices and networks having ever-increasing performance and capabilities. Such computing devices and networks may provide opportunities for individuals and organizations to provide new or improved services to users, increasing user satisfaction and financial gain.

SUMMARY

Aspects of the present disclosure provide methods, systems, and devices for measuring, estimating, tracking, counting, etc. consumables prepared by a kitchen appliance. One general aspect includes a method including: receiving an indication that a brewing cycle of a kitchen appliance is requested; determining, by a processor of the kitchen appliance, whether a container holder or capsule is present in a basket of the kitchen appliance; incrementing, where the container holder is present, a counter indicating a number of containers used by the kitchen appliance since the counter was last reset, each container including a first consumable foodstuff; and estimating, where the container holder is absent, a quantity of a second consumable foodstuff used by the kitchen appliance during the brew cycle. The method also includes completing, by the kitchen appliance, the brewing cycle; and transmitting a signal requesting replenishment of the first consumable foodstuff or the second consumable foodstuff, based on the counter or the estimated quantity. Other embodiments of this aspect include corresponding computer systems, apparatus, and computer programs recorded on one or more computer storage devices, each configured to perform the actions of the methods.

Another general aspect provides a system including a processor. The system also includes a container holder configured to receive a container holding a foodstuff; a container holder presence detector configured to sense a presence of the container holder into a basket of a kitchen appliance and configured to transmit a signal to the processor based on the sensed presence; and memory storing non-transitory computer-readable instructions that, when executed by the processor, cause the processor to perform operations including: receiving an indication that a brewing cycle is requested; determining, based on the presence or absence of the signal, whether a container holder is present in the basket of the kitchen appliance; incrementing, where the container holder is present, a counter indicating a number of containers used by the kitchen appliance, each container including a first consumable foodstuff; estimating, where the container holder is absent, a quantity of a second consumable foodstuff used by the kitchen appliance during the brew cycle; performing the brewing cycle; and transmitting a signal requesting replenishment of the first consumable foodstuff or the second consumable foodstuff, based on the counter or the estimated quantity.

BRIEF DESCRIPTION OF THE DRAWINGS

The following detailed description of the disclosure will be better understood when read in conjunction with the appended drawings. To illustrate the disclosure, there are shown in the drawings various embodiments. It should be understood, however, that the disclosure is not limited to the precise arrangements and instrumentalities shown.

DETAILED DESCRIPTION

Figure 1:
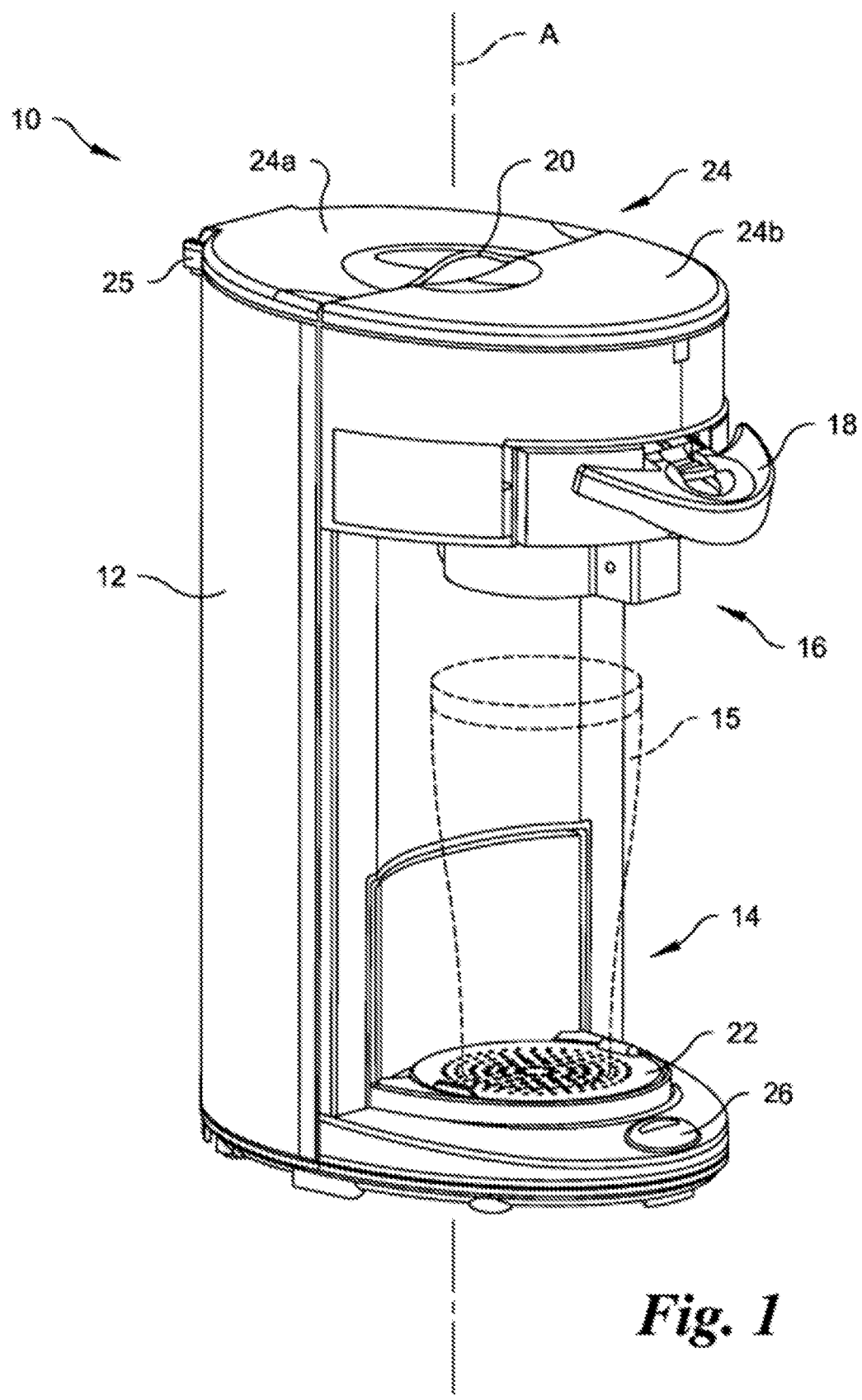
FIG. 1 is a perspective view of a kitchen appliance according to an exemplary embodiment of the present disclosure.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

The present disclosure recognizes that automated replenishment of consumables is a growing area of interest for customers and businesses alike, in that it has the potential to both improve customer satisfaction and create a steady stream of orders for a consumable service or product. Automated replenishment systems utilize information transmitted and received by computing devices over the internet, including network-enabled appliances, to automate the ordering of a service or product when needed, such as when a local stock or supply of the product is nearing depletion, or when a service is required or desirable. Further, compatible products and services may be ordered or requested based on known information about either the customer, the consuming appliance, and/or the consumable. Without automated replenishment, customers may forget to reorder, or may order the wrong size, type, flavor, or amount of product, or may neglect making a service appointment. A known replenishment service is the Dash Replenishment Service offered by AMAZON.

The present disclosure recognizes also that kitchen appliances, especially those for dispensing beverages, present specific challenges to integration with a replenishment service, especially where multiple packages or formats of consumables may be utilized by a single kitchen appliance.

Figure 2:
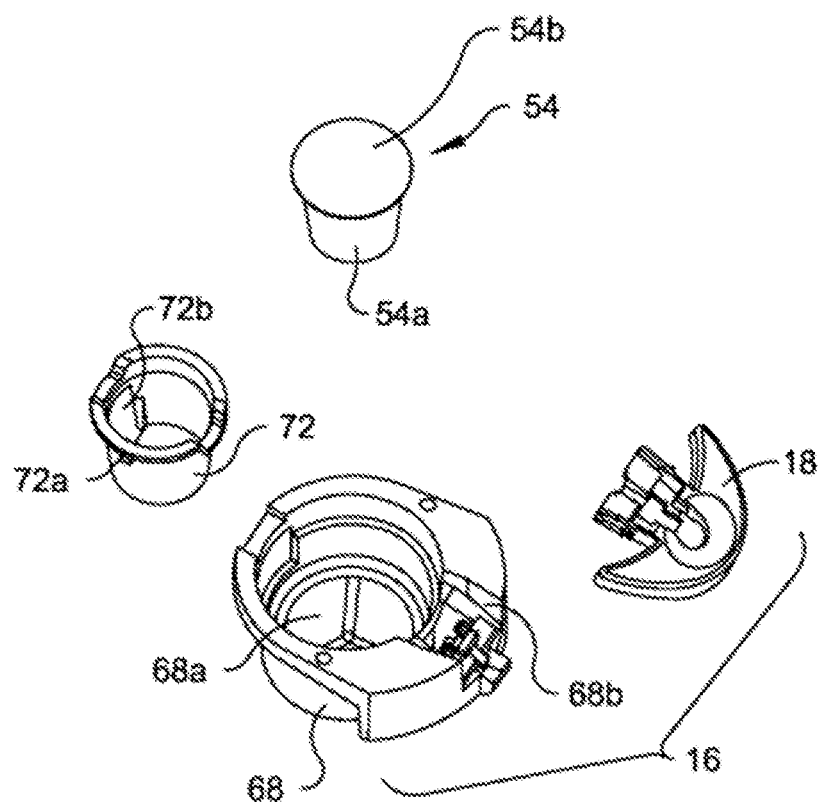
FIG. 2 is a schematic diagram of certain components of the kitchen appliance shown in FIG. 1.

To provide context, FIGS. 1 and 2 illustrate an exemplary kitchen appliance, generally designated 10, in accordance with the present disclosure. The kitchen appliance 10 is intended or designed for preparing a beverage from foodstuff (none shown) to be consumed by a user. The present disclosure is not limited by the type of beverage prepared by the kitchen appliance 10 of foodstuff used to prepare the beverage. For example, the term "foodstuff," as used herein, is sufficiently broad to cover any edible, digestible, or comestible substance, as well as any extractable/infusible substance from which an edible, digestible, or comestible substance can be prepared, such as coffee grounds, tea leaves, hot chocolate powder, soup ingredients, oatmeal and the like.

Thus, the kitchen appliance 10 is versatile because it may be used to create and/or prepare any one of a variety of different types of beverages from a variety of different types of foodstuff. More specifically, the kitchen appliance 10 heats liquid, such as water, to a sufficient temperature to be combined with or poured over the foodstuff to create a hot beverage. The term "beverage" is broadly defined herein as hot water or a combination of liquid and foodstuff.

The kitchen appliance 10 is versatile because it may allow a user to create a beverage from foodstuff in any one of a variety of different forms or states. For example, the kitchen appliance 10 may be used to make coffee or tea from loose coffee grounds or leaves, coffee grounds or leaves contained in a generally soft packet (i.e., a flexible coffee "pod" or a tea bag), or coffee grounds or tea leaves contained in a generally hard container (i.e., a rigid coffee or tea "pod"). The foodstuff is inserted into at least a portion of the kitchen appliance 10 in a dry or generally dry state. Following completion of preparation of the beverage, any moist or saturated foodstuff remaining in the kitchen appliance 10 may be removed and either recycled or discarded. In one sense, the term "consumable foodstuff" reflects this nature of the foodstuff, in that the foodstuff is generally used once prior to being discarded. In a broader sense, a consumable may refer to any item that is used over time, and may be replaceable at the end of its serviceable life. A consumable may be used more than once, and may include non-edible items, such as parts including filters (e.g., water filters, air filters), blades, gas canisters, and other parts or accessories.

Referring to FIG. 1, the kitchen appliance 10 includes an outer housing 12 for enclosing and protecting internal components of the kitchen appliance 10, as described in detail below. A longitudinal axis A of the housing 12 extends at least generally, and in some embodiments exactly, perpendicularly to a support surface, such as a tabletop or countertop (none shown), when the kitchen appliance 10 is placed on the support surface. The housing 12 and/or any components thereof may be constructed from any polymer, metal or other suitable material. For example, an injection molded acrylonitrile butadiene styrene (ABS) material could be employed, but the housing may be constructed of nearly any generally rigid material that is able to take on the general shape of the housing 12 and perform the functionality of the housing 12 described herein. The housing 12 may be generally or completely opaque, translucent or transparent.

The housing 12 may include a recess 14 that is sized, shaped and/or configured to receive and/or support at least a portion of cup, pot, travel mug or other vessel 15 (shown in phantom in FIG. 1) for receiving a beverage or liquid that exits the kitchen appliance 10. The beverage may flow, drip or otherwise accumulate in the vessel 15, and the vessel 15 is removed from the recess 14 prior to consumption of the beverage by the user. A drip tray or grate 22 may be positioned proximate a lower end of the recess 14 to receive any excess beverage or liquid is not received in the vessel 15. Grate 22 acts as a cup support and may be repositioned to adjust for the size of the vessel 15. For instance, grate 22 can be positioned to act as a shelf (not shown) so that a mug would be positioned closer to the drawer 16. In a second position, grate 22 can accommodate a taller travel vessel.

As shown in FIG. 1, an on/off button 26 may be exposed on the housing 12. The kitchen appliance 10 of the present embodiment prepares a beverage of a single-serving size (which is up to approximately 16 ounces of prepared beverage), although it is envisioned that the embodiments disclosed herein could be operative with larger serving sizes as well. Depressing the on/off button 26 may begin an operating cycle, and subsequent depressing the on/off button 26 may end the operating cycle. The phrase "operating cycle" is broadly defined herein as a period of time when the kitchen appliance 10 is first activated to when the beverage is fully prepared and the kitchen appliance 10 is deactivated. The kitchen appliance 10 may be capable of performing one or both of a pressurized and un-pressurized brewing cycles. For each pressurized operating cycle, there can be a plurality of pressure/vacuum cycles, as described in detail below, which may act to increase an average pressure of fluid within the kitchen appliance 10 to prepare the beverage. The kitchen appliance 10 may automatically turn off or deactivate once the operating cycle is complete, as described below. The kitchen appliance 10 is not limited to including a single on/off button 26. For example, additional buttons, knobs, switches and/or levers (none shown) could be added to the kitchen appliance 10 to allow the user increased control over the functionality and/or operation of the kitchen appliance 10. For example, the kitchen appliance 10 may include a button that allows the user to select between different modes of operations or a flow selector to select between a single serve function and a multi-serve function.

Referring again to FIG. 1, a cover 24 may be removably positioned or attached to an upper end of the housing 12. The cover 24 may enclose an interior cavity of the housing 12 and permits access thereto. At least a portion of the cover 24 may be movable between a first, upward or removed position (not shown) for allowing liquid to be inserted into at least a portion of the housing 12, and a second, downward or attached position (see FIG. 1) for closing and/or sealing the internal cavity of the housing 12. In a properly closed position (see FIG. 1), the cover 24 may seal the interior cavity of the housing 12 to create a fluid-tight connection. Alternatively, the closed cover 24 may not be "air-tight," such that it permits gas to enter into at least a portion of the interior cavity of the housing 12. A second portion, which is designated as 24*b* in FIG. 1, may be fixed and enclose other parts of appliance 10.

To insert liquid into the appropriate portion of the housing 12 to commence an operating cycle, an openable portion of the cover (designated as 24*a* in FIG. 1) or the entire cover (designated as 24 in FIG. 1) is temporarily removed or pivoted to an open position with respect to the housing 12 to expose at least a portion of the interior cavity thereof. The cover 24 or cover portion 24*a* may be attached to at least a portion of the housing 12 by a hinge 25. Alternatively, the cover 24 or cover portion 24*a* may be snap-fitted or friction-fitted onto a least a portion of the upper end of the housing 12.

Referring now to FIG. 2, which is an exploded view of some of the components of the kitchen appliance 10, including the drawer 16 of the kitchen appliance 10, the drawer 16 may include a basket 68 having a filter 68*a* in a bottom wall thereof. The basket 68 may receive foodstuff therein, such as loose coffee grounds, a soft "pod" or a tea bag, for example. Liquid from a discharge port (not shown) of the fluid path may flow over and/or through the foodstuff placed directly into the basket 68, through the filter 68*a* and into the vessel (not shown) for consumption by the user.

In the pressurized mode of operation, the kitchen appliance 10 includes or works in combination with a container 54 that at least partially encloses the foodstuff used to prepare the beverage. The container 54 may include a generally rigid body 54*a* and a cap or foil top 54*b* removable therefrom. The container 54 may be a conventional K-CUP®, a rigid pod, or any other structure that is capable of holding or storing foodstuff. The container 54 may be removably insertable into the drawer 16. When the container 54 is properly inserted into the drawer 16 and the drawer 16 is properly attached to the housing 12, an interior of the container 54 may be fluidly connected to the discharge port of the fluid path. More specifically, the discharge port may be at least partially inserted into the container 54, such that a tip or distal end of the discharge port pierces or is otherwise inserted into the cap 54*b* of the container 54. The container restricts the flow through the discharge port in a manner that causes appliance 10 to operate in a pressurized mode.

To prepare a beverage using a container 54 or otherwise operate the kitchen appliance 10, a container holder 72, the basket 68 and the handle 18 may be used in conjunction with other components not shown in FIGS. 1 and 2. The container holder 72 may be sized, shaped and/or configured to receive the container 54 therein. The container holder 72 may be at least slightly larger than the container 54, such that the container holder 72 generally surrounds the entire container 54 when the container 54 is properly placed therein. The basket 68 may be sized, shaped and/or configured to receive the container holder 72. The basket 68 may be at least slightly larger than the container holder 72, such that the basket 68 generally surrounds the entire container holder 72 when the container holder 72 is properly placed therein.

Figure 9:
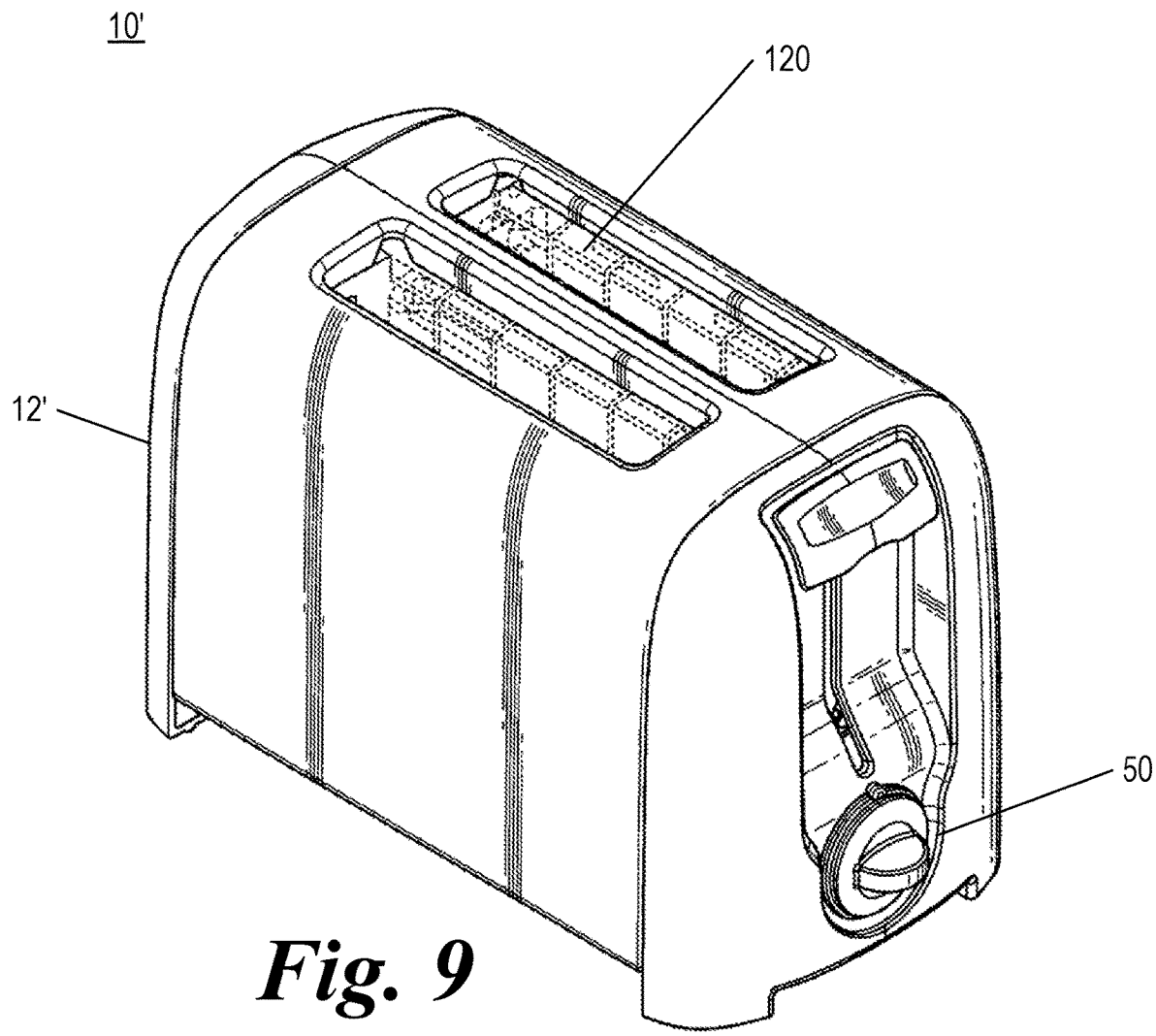
FIG. 9 is a perspective view of a kitchen appliance according to an exemplary embodiment of the present disclosure.

It is noted herein that the components shown in FIG. 2 are merely for providing context for the present disclosure, and that other not shown components may be included in the kitchen appliance 10. The components shown in FIGS. 1 and 2 are merely examples, and are provided for context of the inventive concepts of the present disclosure, which may be embodied in other kitchen appliances than kitchen appliance 10 shown in FIGS. 1 and 2. For example, FIG. 9 shows a toaster kitchen appliance 10'. The toaster 10' may comprise a housing 12 having one or more slots 120 dimensioned to receive consumable food products, e.g., generally planar-shaped food products such as bread, bagels, and pre-filled pastries. A user may insert one or more consumable food products into a respective slot 120 of the toaster 10', and specifically into a bread lifting apparatus (not shown) within the housing 12. Controls for the toaster 10' are designated broadly as 50.

Other kitchen appliances 10' in accordance with the current disclosure may include waffle makers, slow cookers, blenders, juicers, pressure cookers, or the like that accept and prepare either discrete quantity foodstuffs (such as pieces of toast, frozen waffles, toaster pastries, whole unbroken eggs, and so on), and/or foodstuffs having non-discrete quantities (e.g., liquids, batters, doughs, uncooked and scrambled eggs, and so on). Other components not illustrated or discussed herein may be present in the kitchen appliance 10 or 10'. For example, one or more control units or control processors may be located within the kitchen appliance 10 or 10', so as to control operation of the various components of the kitchen appliance (e.g., the hot water generator of the kitchen appliance 10, or the heating elements and/or timer of the kitchen appliance 10').

As discussed, it is recognized by the present disclosure that kitchen appliances such as kitchen appliance 10 or kitchen appliance 10' present challenges to integration with a replenishment service. For example, two different consumables may be used with the kitchen appliance 10, e.g., loose product, such as loose coffee grounds, and containers 54. These consumables are often sold in different packaging and with different formats: containers 54 are generally distributed with a specific quantity (e.g., 10 containers per package), while loose product is generally sold by weight (e.g., 12 ounces of coffee). The containers 54 are used in a relatively discretized manner; e.g., one container per brew cycle. Conversely, loose product may be used according to brew amount (e.g., fluid amount), strength, or taste. Finally, although some individuals may prefer one consumable form over the other, many individuals, households, and organizations may consume both types of consumables, either because different individuals in the household or organization may prefer one type to the other, because a first favored consumable is available in only one format and a second favored consumable is available in only the second format, or because of cost fluctuations in and between formats (as examples). Recognizing that the kitchen appliance 10 may be used with both types of consumable formats, the present disclosure provides methods, systems, and devices in which it is determined what type of consumable is being used during a specific operation cycle (e.g., brew cycle) of the kitchen appliance 10.

With respect to the toaster kitchen appliance 10' a variety of foodstuffs may be inserted and heated therein, which may also present challenges to integration with a replenishment service. For example, during a single day, a first household member may prepare a bagel using the kitchen appliance 10', a second household member may prepare a toaster pastry using the kitchen appliance 10', and a third household member may prepare bread for consumption without using the kitchen appliance 10'. Recognizing that the kitchen appliance 10' may be used with a variety of foodstuffs, the present disclosure provides methods, systems, and devices in which it is determined what type of consumable is being used during a specific operation cycle (e.g., toast cycle) of the kitchen appliance 10'.

Figure 3:
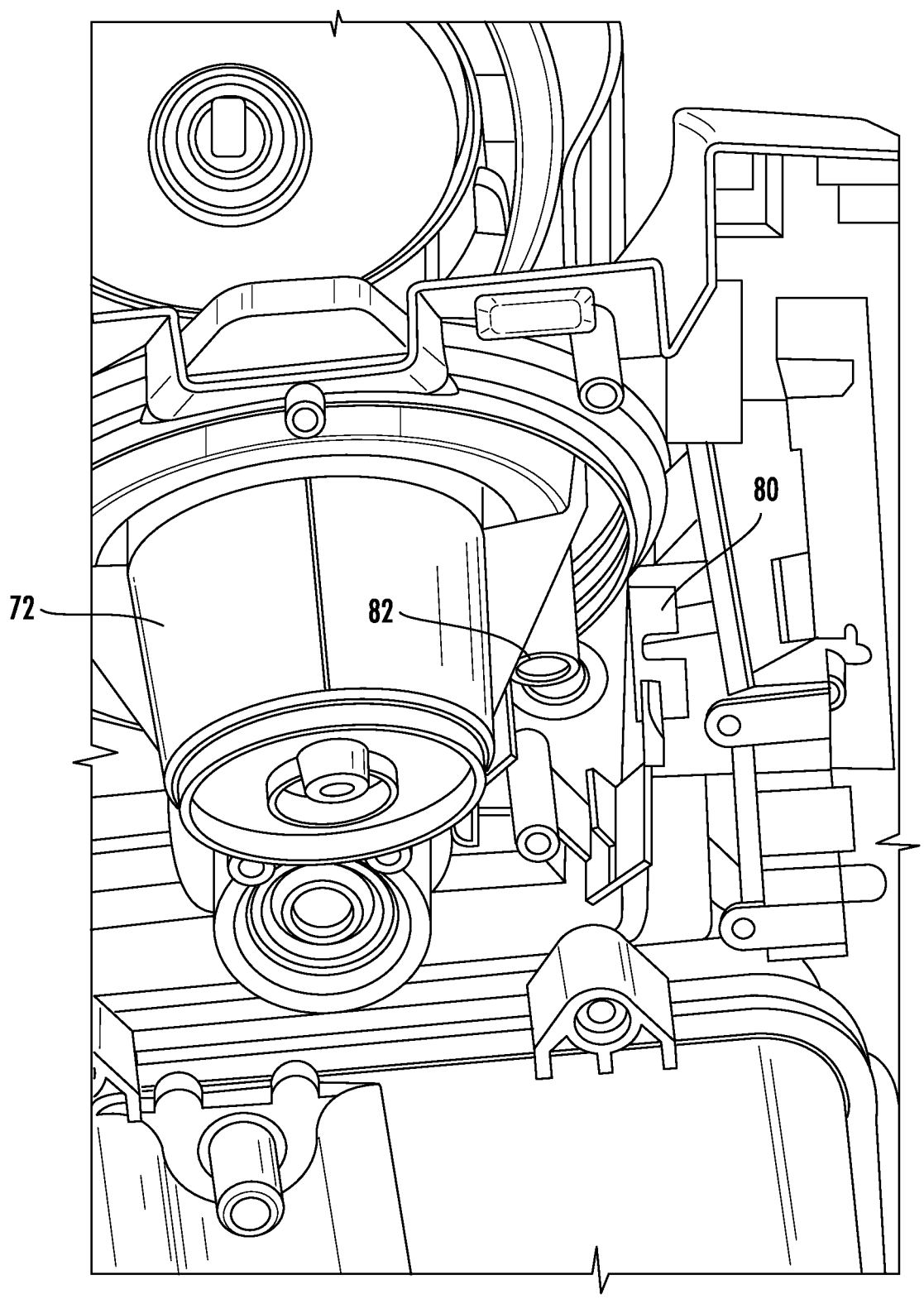
FIG. 3 is a schematic diagram of certain portions of the kitchen appliance shown in FIG. 1.

As seen in FIG. 3, a kitchen appliance 10 in accordance with the present disclosure includes container holder presence sensor 80, which may operate in conjunction with optional container holder sensed component 82. In a preferred embodiment, and as seen in FIG. 3, the container holder sensed component 82 is a magnet attached to the container holder 72, and the container holder sensor 80 is a magnetic-sensitive sensor located proximate to the basket 68 and/or handle 18. The magnetic-sensitive sensor may be a Hall effect sensor, reed switch sensor, or the like. Upon insertion of the container holder 72 into the basket 68, the magnetic-sensitive container holder presence sensor 80 detects the magnet of container holder sensed component 82, and transmits a signal indicating the detection. In other embodiments, the container holder sensed component 82 may be a rib or shoulder in a wall or surface of the container holder 72 that engages with a mechanical switch or closes an electrical contact of the container holder presence sensor 80, which transmits a corresponding signal indicating detection of the rib or shoulder. In other embodiments, the container holder sensed component 82 may be a rib or shoulder in a wall or surface of the container holder 72 that blocks or permit light to pass therethrough (e.g., from a light emitting diode or other light source), and the container holder presence sensor 80 may be a photodiode or other light receiving apparatus, which transmits a corresponding signal indicating detection of light from the light source or a signal indicating an absence of detection of light from the light source.

In other embodiments, the container holder presence sensor 80 is a receiver configured to receive a signal generated by and transmitted by the container holder sensed component 82. For example, the container holder sensed component may be a radio frequency identification (RFID) tag, which may be activated by coming into proximity with the container holder presence sensor 80, a tag reader. In other embodiments, the container holder presence sensor 80 may be a reader configured to read a signal indicating the presence of the container holder sensed component 82. For example, the container holder presence sensor 80 may be a bar code scanner, which may configured to read a bar code label printed or otherwise affixed to the container holder 72.

In other embodiments, coil to coil induction (capacitive or resistive) may be used to detect the presence or absence of the container holder 72. In still other embodiments, a scale or other mass sensing apparatus may be used to detect a mass of the container holder 72 when the container holder 72 is present.

Some variations of the preferred embodiment (e.g., the magnet and magnetic-sensitive sensor) may use magnetic poles or orientations of the magnet or the magnetic-sensitive sensor to indicate presence of a first magnet in a first container holder 72, and presence of a second magnet (having a different orientation than the first magnet) in a second component (e.g., the basket 68). The use of magnets having different orientations may take advantage of variations in forces resultant from the differing orientations to provide increased accuracy in detection and/or identification of one or more components.

Figure 4:
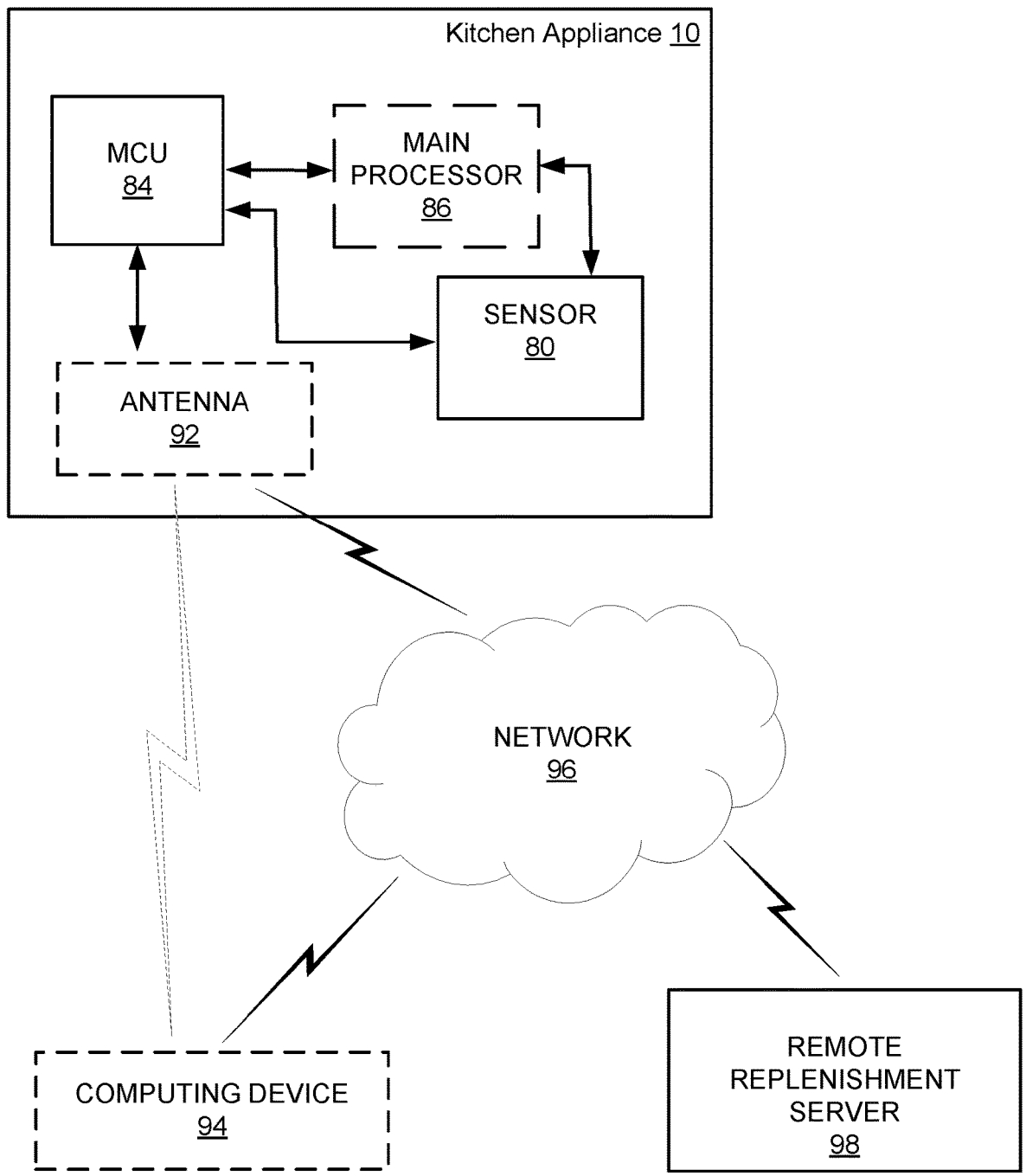
FIG. 4 is a block diagram of certain components of a consumable determining system according to some embodiments of the present disclosure.

FIG. 4 is a block diagram of some of the components of a consumable determining system 100 that is in accordance with the present disclosure. The consumable determining system may include the kitchen appliance 10 discussed with reference to FIGS. 1-3, and may further include the container holder presence sensor 80 previously discussed. Further, the kitchen appliance 10 may include a processing unit or processor 84, which may be referred to as a micro control unit (MCU). The MCU may control operation of one or more functions, features, and/or components of the kitchen appliance 10, including but not limited to initiating a brew cycle or the like. Additionally and/or alternatively, the MCU 84 may be a component separate from a processor or microcontroller (e.g., another MCU) 86 that controls operation of the kitchen appliance 10, and in such embodiments the MCU 84 may be tasked with controlling intercommunication between the kitchen appliance 10 and one or more devices that are remote from the kitchen appliance 10. Put differently, the features and functionality discussed herein with reference to MCU 84 may be performed by a single processor (which may be a microprocessor) within the kitchen appliance 10, either controlling the functionality of the kitchen appliance 10 generally, or acting as a subordinate to a different processor 86 within the kitchen appliance 10. Alternatively, functionality described herein may be performed by a plurality of processors 84 (or microprocessors) within the kitchen appliance 10, which may act in in a host-subordinate relationship.

Figure 5:
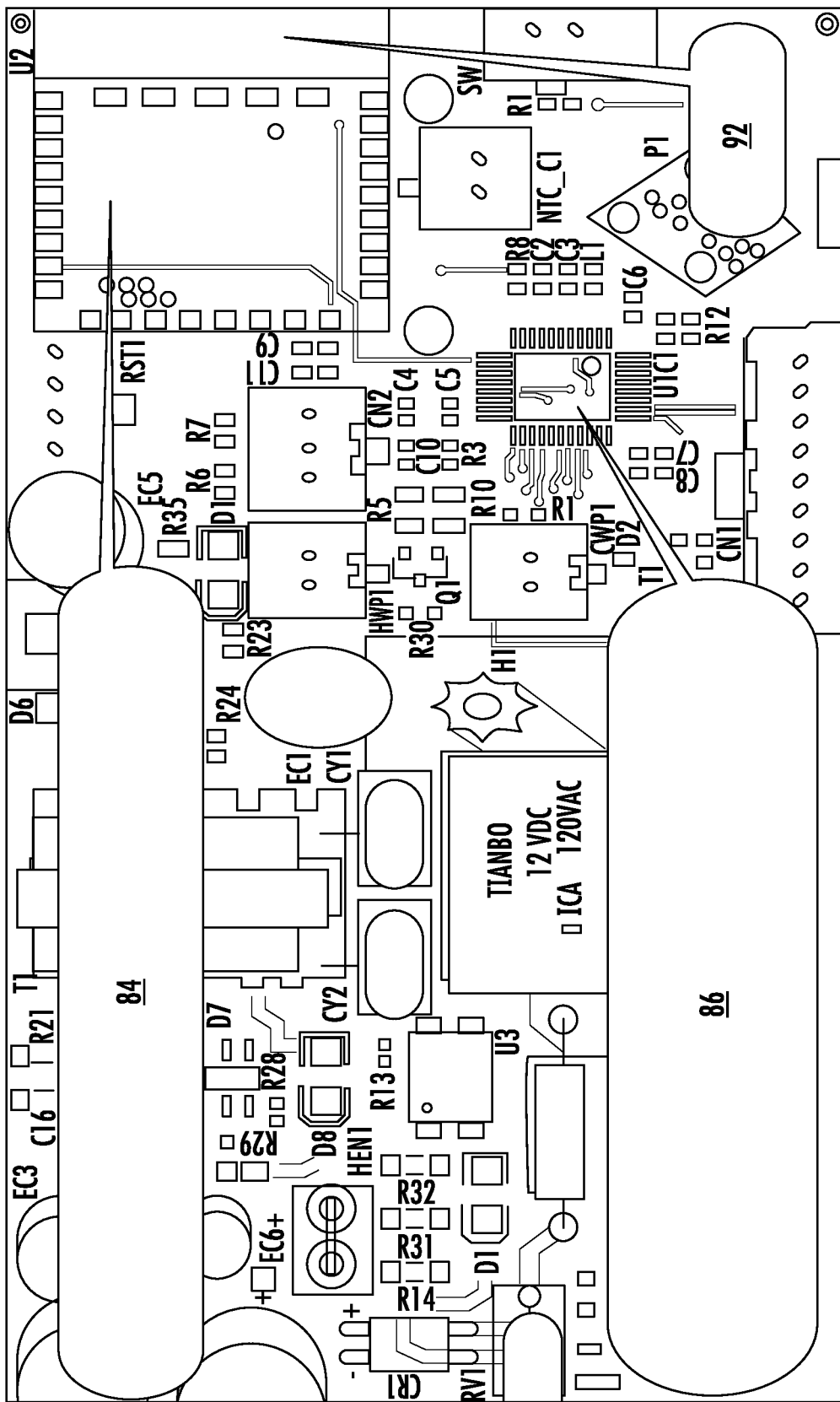
FIG. 5 is a schematic diagram of certain portions of the kitchen appliance shown in FIG. 1.

FIG. 5 is a diagram of a printed circuit board showing the relationship between an MCU 84 that is part of an communication module and in communicative contact with a host MCU 86 that controls other functionality of the kitchen appliance 10. An antenna 92 may be also part of the communication module for facilitating wireless communication (e.g., Wi-Fi communication).

Referring again to FIG. 4, The MCU 84 may be in operative contact or communication with one or more remote devices or networks (e.g., via an antenna 92), including a computing device 94 (which may be a computing device of a user of the kitchen appliance 10) and/or a network 96. The network 96 can comprise one or more networks, such as a wide area network (e.g., a service network, a provider network, a first network, a second network, the Internet), a non-wide area network, a public network, an open network, a private network, a closed network, a user managed network, a user controlled network, a user deployed network, non-user controlled or managed networks, and/or the like. Other forms of communications can be used, such as wired and wireless telecommunication channels, for example. The computing device 94 may be a mobile device (e.g., a smartphone, a tablet), a laptop computing device, a desktop computing device, or the like. In some aspects, the MCU 84 may be in communication with the computing device 94 via the network 96 or a sub-network thereof. In some aspects, the MCU 84 may be in communication with the computing device 94 via a direct link (e.g., a link established using a BLUETOOTH protocol or other device-to-device protocol). In some aspects, the computing device 94 may be operated by a user thereof to initialize, reset, set-up, configure, re-configure, and/or operate the kitchen appliance 10 (or features thereof). For example, a user may use computing device 94 to initiate a brew cycle, to input information such as foodstuff preferences, brewed product preferences, or the like, set a time or timer of the brew cycle, setup a wireless network (e.g., a WiFi network) with a service set identifier (SSID) and/or password, provide inventory correction data, or the like. In some aspects, the computing device 94 may be optional.

The MCU 84 and/or the computing device 94 (if present) may each also be in communication with a remote replenishment server 98, which may be operated by a replenishment service and/or another individual or organization. For example, a manufacturer of the kitchen appliance 10 may operate the remote replenishment server 98 as an included or optional service tied to acquisition of a kitchen appliance 10. In other aspects, the remote replenishment server 98 may be operated by a distributor, seller, or other organization, as part of a replenishment service. The kitchen appliance 10 (via the MCU 84) and/or the computing device 94 may be in communication with the remote replenishment server 98 using communication protocols which may be specific to the kitchen appliance 10 or a manufacturer thereof, or available to a plurality of manufacturers (e.g., a communication standard, a software development kit, an application programming interface, a web services protocol, or the like).

Figure 6:
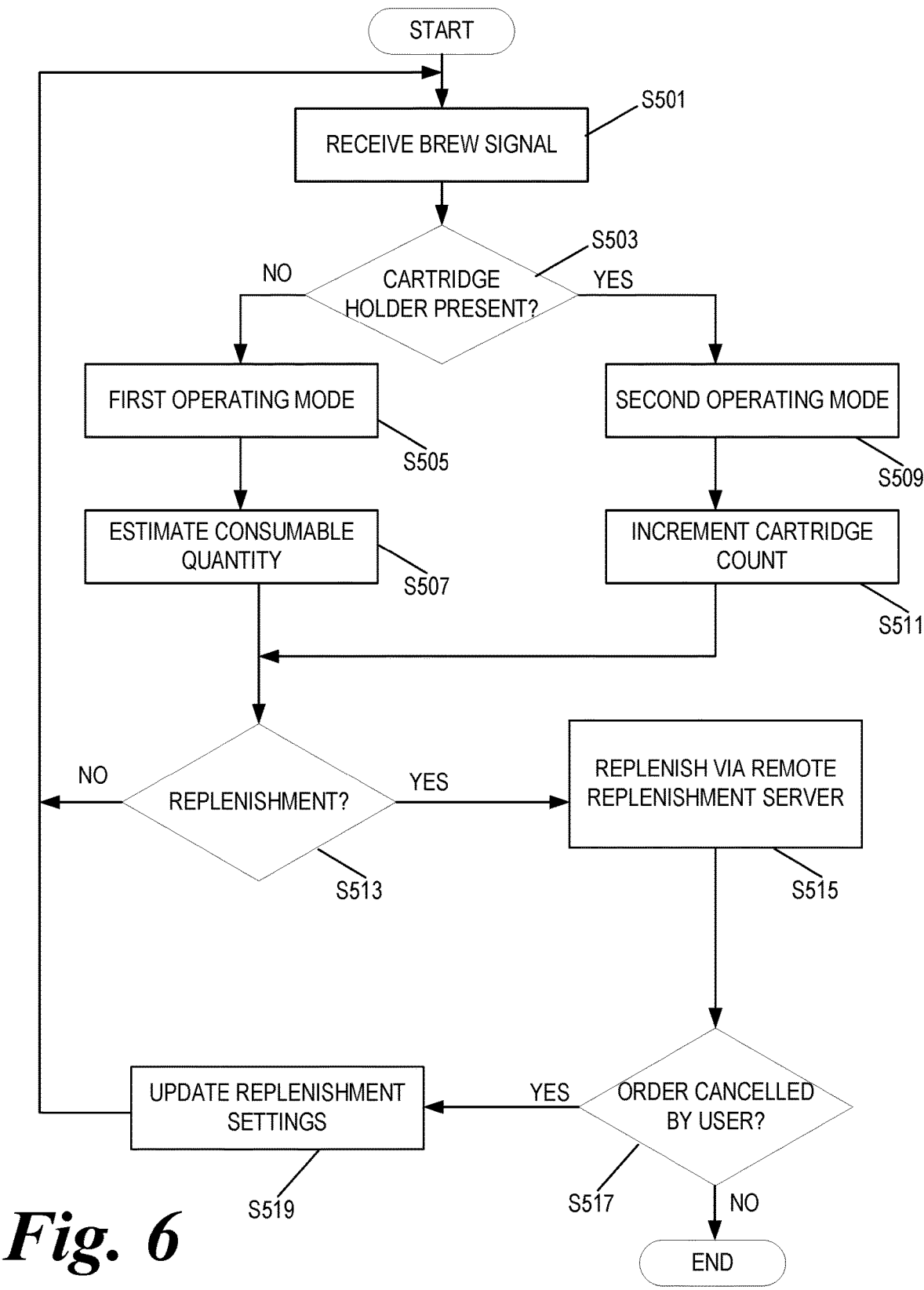
FIG. 6 is a flow chart of a method of operation within the consumable determining system of FIG. 4.

FIG. 6 is a flowchart illustrating exemplary operations of a method of replenishing a consumable used in kitchen appliance 10. It is stressed that the operations of the method shown of FIG. 6 are not intended to be complete, and that other operations, or sub-operations, may be contemplated by one skilled in the art. For example, at operations S505 and S509, a brew cycle may be initiated, with the type of brewing cycle initiated (e.g., a first type of brewing cycle in operation S505, and a second type of brewing cycle in operation S509) different for each operation. The type of brewing cycle initiated is dependent upon whether the container holder 72 or container packaging is present (e.g., a determination is made in operation S503, with yes or no branches stemming therefrom). The determination may be performed responsive to receiving a signal (e.g., responsive to receiving a signal at MCU 84 and/or processor 86) to initiate a brew cycle in operation S501. However, not shown in FIG. 6 are any and all operations to determine whether a brew cycle may be safely performed. Put differently, safety checks, status checks, or other operations may be performed in conjunction with the method of FIG. 6, as would be understood by one of skill in the art.

Returning to FIG. 6, based on the type of brew cycle selected (e.g., based at least in part on the presence or absence of the container holder), a consumption counter may be incremented. For example, in operation S511, a data value indicating a number of containers 54 consumed since the data value was last reset may be incremented by one. Containers 54 may be discrete units of consumption, and the data value may reflect the number of containers 54 consumed with a relatively high degree of accuracy (with some variance due to product defects or the like).

If the first type of brewing cycle brew is initiated, however, then it may be preferable to estimate the consumable quantity in operation S507, as the consumable may not be discrete packages. It is noted that ground coffee, tea, and/or other foodstuffs may be used by volume (e.g., tablespoons, teaspoons, or other unit of volume measurement); however, commonly such foodstuffs are sold by weight for convenience of the retailer and distributor (e.g., 12 ounces, 350 grams, etc). One estimation approach then may be to assume that each brew consumes a predetermined amount of consumable. In some embodiments, where the brewer is configurable to brew in predetermined vessel sizes or amounts (e.g., a small, medium, or large brew), each predetermined vessel size may correspond to a predetermined amount of consumable (e.g., two tablespoons for a small brew, four tablespoons for a large brew). In some embodiments, the density of specific consumables (e.g., the ratio of the consumable mass to the consumable volume) may be predetermined and retrieved from a data store. For example, a user may indicate as an input to the kitchen appliance 10 a brand name, product name, stock keeping unit, roast type, or other information to identify a specific consumable, and a density of the specific consumable may be retrieved and used in the estimation operation of S507. In some embodiments, a default density may be used in the absence of density information of a specific consumable.

In some embodiments, pressure (e.g., backpressure) on a pump in the fluid path may be used to determine the amount of consumable being used. As an example, different values of sensed pump pressure, flow rate, motor load (e.g., current), or the like, may be correlated with different quantities of consumable, and may be used to determine the presence of a consumable.

In some embodiments, improved accuracy may be obtainable by receiving preference data from a user (e.g., via computing device 94 and an application executed by a processor thereof). The preference data may include, e.g., coffee strength or grounds usage. For example, the user may be given choices such as "Mild," "Default," or "Strong." A "Strong" selection would cause the app to recommend the amounts of coffee to be used for each cup size as noted in the table below.

TABLE 1

Recommended and assumed consumable consumption based on consumer preference selection.

| | Cup Size | | |
|---|---|---|---|
| Strength | Small (8 oz) | Medium (10 oz) | Large (14 oz) |
| Mild | 2 tbsp. | 3 tbsp. | 4 tbsp. |
| Default | 3 tbsp. | 4 tbsp. | 5 tbsp. |
| Strong | 4 tbsp. | 5 tbsp. | 6 tbsp. |

Each initiation of a brewing cycle may result in an estimated consumption of the consumable, which may be stored in a data store (e.g., a memory location or readable memory device). The estimated consumptions of the consumable across a plurality of brew cycles may be accumulated into an accumulated estimated consumption amount.

At the completion of the brew cycle (e.g., operations S505 or S509), and after the completion of the calculation of the consumed amount of the consumable, a determination as to whether a replenishment is made in operation S513. This may be performed, for example, by comparing the number of containers 54 consumed since the last replenishment with a threshold value, which may take into account order timing, delivery timing, product availability, consumption rate, and/or other criteria. Similarly, the amount of consumed "loose" consumables used in the second type of brew cycle may be comparing with a threshold value, which may take into account order timing, delivery timing, product availability, consumption rate, and/or other criteria. If no replenishment is needed, the method may revert to the beginning and await indication of a further brew. If a replenishment of one or more consumables is desired, however, the kitchen appliance 10 (via MCU 84 thereof) may contact the remote replenishment server 98 and initiate a replenishment process in accordance with the criteria of the remote replenishment server 98. One or more notifications may be communicated to the kitchen appliance 10 and/or the computing device 94 of the user indicating that replenishment is pending. The stored values of a consumed quantity of a consumable may be reset to zero.

In some embodiments, the determination that a replenishment is required may be in error, and a user may cancel the replenishment order or process (operation S517). For example, a consumer may have excess quantities of the consumable, and replenishment is not needed at the present time. As another example, the estimation model of the "loose" consumable may be in error, in part because of a user's taste preferences being mis-entered. For example, where pressure on a pump in the fluid path is used to determine the amount of consumable being used, the pressure sensed may differ from the value expected for the stated quantity of consumable. The following scenario is contemplated: a consumer may express a preference of "Default" brew strength, and may select a "large" vessel size. As per the table above, pump backpressure would be expected to be comparable with a load approximating 5 tbsp. However, if the pump load is closer to the expectation of 2 tbsp, then it may be inferred that the consumer did not follow the recommended fill volume for the strength and vessel preferences. In operation S519, such feedback could be used to update the replenishment criteria, to improve user satisfaction.

Figure 7:
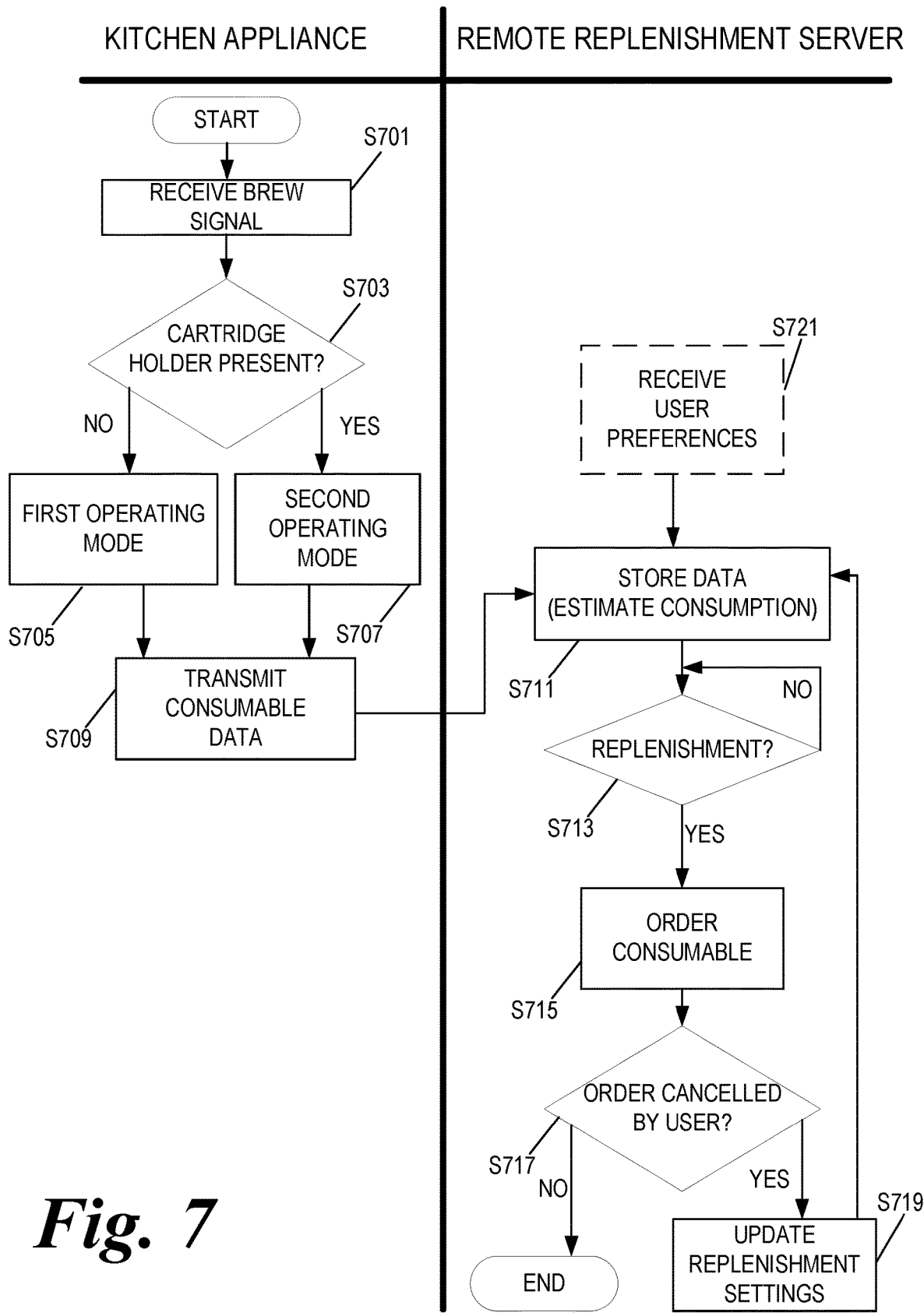
FIG. 7 is a flow chart of a method of operation within the consumable determining system of FIG. 4.

FIG. 7 a flowchart illustrating example operations of another exemplary method of replenishing a consumable used in kitchen appliance 10. It is stressed that the operations of the method shown of FIG. 7 are not intended to be complete, and that other operations, or sub-operations, may be contemplated by one skilled in the art. Operations S701, S703, S705, and S707 are comparable to operations S501, S503, S505, and S507, respectively, and repeated discussion of these operations in omitted in favor of the discussions of the respective operations above.

In operation S709, consumable data may be transmitted by the kitchen appliance 10 to the remote replenishment server 98, where it may be stored in operation S711. This consumable data may include a brew strength, a brew amount (e.g., number of ounces of fluid), the presence or absence of the container holder 72, whether the brew was pressurized or unpressurized, a brand name, product name, stock keeping unit, roast type, or other information to identify a specific consumable (e.g., stored in memory in the kitchen appliance 10 or read from a barcode, label, tag, or the like of the consumable), a density of the specific consumable, a time and date of the brew cycle initiation, or other data. In some embodiments, data transmitted may be combined with other data retrieved or received by the remote replenishment server 98. For example, the remote replenishment server may receive user preferences or other data from the computing device 94 in optional operation S721, which may be performed independently of the initiation of the brew cycle and other operations of FIG. 7. Further, in operation S709 or S711, an estimation of a quantity of consumed amount may be performed by the kitchen appliance 10 and/or the remote replenishment server 98, proceeding similarly to the discussion of estimation in FIG. 6, above.

A determination may be made as to whether a replenishment is made in operation S713. This may be performed, for example, by comparing the number of containers 54 consumed since the last replenishment with a threshold value, which may take into account order timing, delivery timing, product availability, consumption rate, and/or other criteria. Similarly, the amount of consumed "loose" consumables used may be compared with a threshold value, which may take into account order timing, delivery timing, product availability, consumption rate, and/or other criteria. If no replenishment is needed, the remote replenishment server may await further data from the kitchen appliance. If a replenishment of one or more consumables is desired, however, the remote replenishment server 98 and initiate a replenishment process. One or more notifications may be communicated to the kitchen appliance 10 and/or the computing device 94 of the user indicating that replenishment is pending. The stored values of a consumed quantity of a consumable may be reset to zero. As with the method of FIG. 6, the method of FIG. 7 may include updating the replenishment settings (operation S719) when a user cancelled the replenishment order (operation S717). Operations S717 and S719 correspond with operations S517 and S519, respectively, and reference is made to the fuller discussion of these operations, above.

Although the examples of FIGS. 3-8 are more specific to a brewing kitchen appliance (e.g., kitchen appliance 10), it may be seen that concepts presented therein may be applied to other devices or kitchen appliances, such as kitchen appliance 10' of FIG. 9. For example, different foodstuffs inserted into the kitchen appliance 10' may be identified by weight, optically, or responsive to user controls. For example, a bar code scanner may be employed and configured to read a bar code label printed or otherwise affixed to a container in which a foodstuff is packaged. As another example, a scale or other mass sensing apparatus may be used to detect a mass of a basket in which a foodstuff is inserted. As yet another example, an optical detector may receive light reflected by the foodstuff and perform an analysis thereon to determine to a desired degree of certainty as to the type of foodstuff inserted into the kitchen appliance 10'.

As still another example, the kitchen appliance 10' may include a number of controls, toggles, switches, or the like which may receive user input and perform various functionality based thereon. For example, a user may select a "bagel" or "defrost" or "toaster pastry" indicator, which may enable or disable a subset of heating elements within the kitchen appliance 10', or may lengthen or shorten a time in which all or a subset of heating elements within the kitchen appliance 10' are energized. In some embodiments, a MCU within the kitchen appliance 10' may be configured to receive signals indicative of such input and may be configured to recognize that a particular foodstuff or type of foodstuff is being prepared. For example, if a user selects the "bagel" control, the MCU may perform one or more operations that may result in increment of a "bagel" consumption counter (similar to that discussed with respect to operation S511).

As discussed, a consumable may be used more than once, and may include non-edible items, such as parts including filters (e.g., water filters, air filters), blades, gas canisters, and other parts or accessories. In some embodiments, the MCU may be configured to count a number of cycles or operations, and may be configured to perform automated replenishment of a part based on the number of cycles or operations exceeding a predetermined threshold. For example, the manufacturer of the kitchen appliance 10 may suggest that a water filter therein is replaced every 1,000 brewing cycles, and the MCU thereof may be configured to perform automated replenishment of the water filter at approximately 960 completed brewing cycles. The user may install the new water filter received via automated replenishment and the kitchen appliance 10 may be configured to receive an indication of the installation of the new water filter (e.g., either via user input or detecting the installation automatically without user input). The MCU may be configured to reset the counter of the number of cycles or operations based on the indication of the installation.

Figure 8:
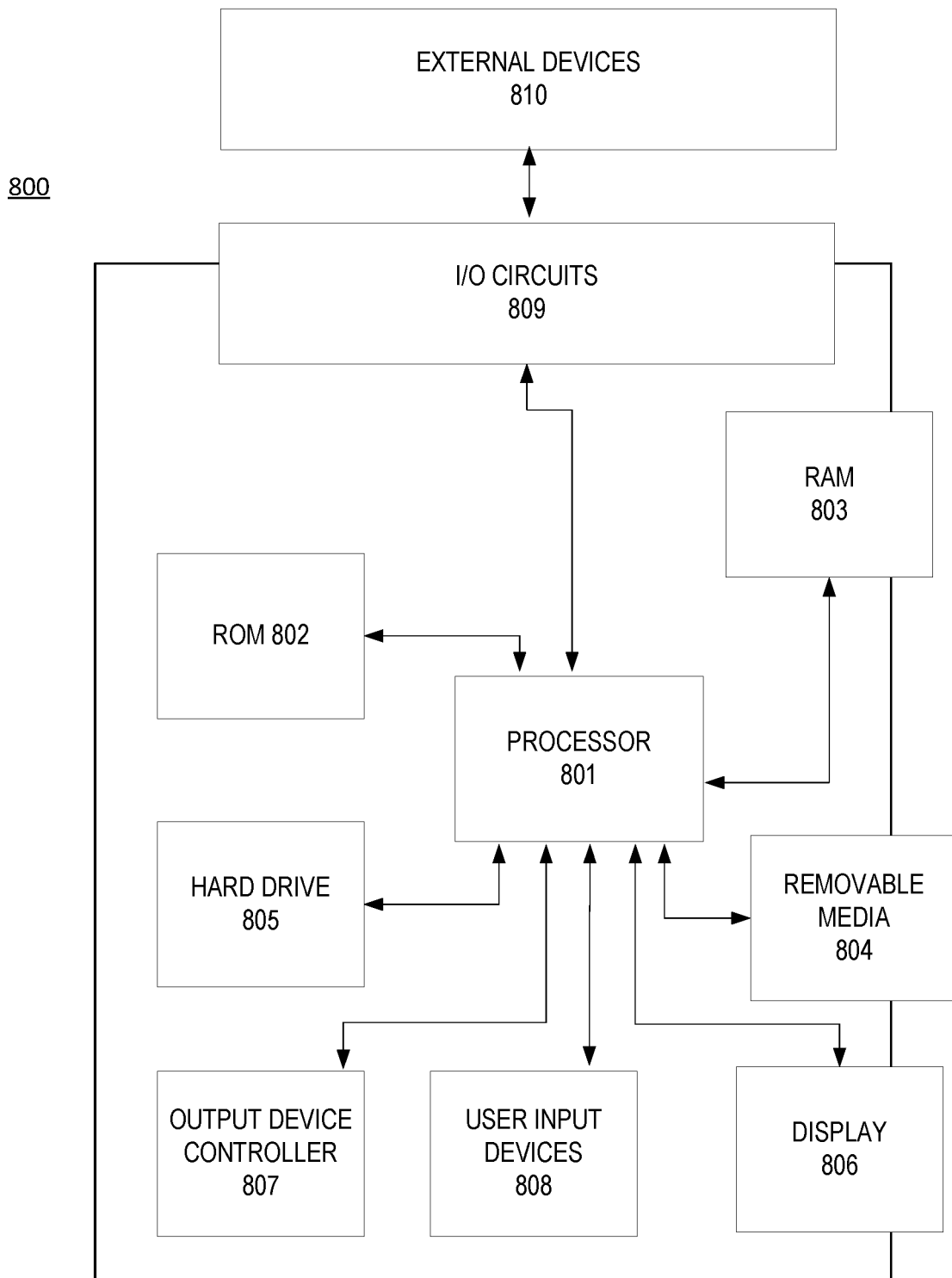
FIG. 8 is a block diagram of certain components of an example computing device, which may be used to implement the various computing devices of the present disclosure.

FIG. 8 illustrates hardware elements that can be used to implement any of the various computing devices or components thereof discussed herein (e.g., kitchen appliance 10, computing device 94, remote replenishment server 98). In some aspects, general hardware elements may be used to implement the various devices discussed herein, and those general hardware elements may be specially programmed with instructions that execute the algorithms discussed herein. In special aspects, hardware of a special and non-general design may be employed (e.g., ASIC or the like). Various algorithms and components provided herein may be implemented in hardware, software, firmware, or a combination of the same.

A computing device 800 may include one or more processors 801, which may execute instructions of a computer program to perform any of the features described herein. The instructions may be stored in any type of computer-readable medium or memory, to configure the operation of the processor 801. For example, instructions may be stored in a read-only memory (ROM) 802, random access memory (RAM) 803, removable media 804, such as a Universal Serial Bus (USB) drive, compact disk (CD) or digital versatile disk (DVD), floppy disk drive, or any other desired electronic storage medium. Instructions may also be stored in an attached (or internal) hard drive 805.

The computing device 800 may include one or more output devices, such as a display 806, and may include one or more output device controllers 807, such as a display processor. There may also be one or more user input devices 808, such as a remote control, keyboard, mouse, touch screen, microphone, or the like. The computing device 800 may also include input/output circuits 809 which may include circuits and/or devices configured to enable the computing device 800 to communicate with external devices 810. The input/output circuits 809 may include one or more network interfaces, such as a network card, to enable to the computing device 800 to communicate with an external device via an external network (not shown). The network interface may be a wired interface, wireless interface, or a combination of the two. The external device may be a remotely located device.

It will be appreciated by those skilled in the art that changes could be made to the embodiments described above without departing from the broad inventive concepts disclosed herein. It is understood, therefore, that this disclosure is not limited to the particular embodiments disclosed, but it is intended to cover modifications within the spirit and scope of the present disclosure as defined by the appended claims.

What is claimed is:

1. A method comprising:
providing a kitchen appliance, the kitchen appliance receiving an indication that a brewing cycle of the kitchen appliance is requested by an appliance user;
determining, by a processor of the kitchen appliance, whether a container holder or capsule is present in a basket of the kitchen appliance;
incrementing, by the processor of the kitchen appliance or a remote replenishment server, where the container holder or capsule is present, a counter indicating a number of capsules used by the kitchen appliance since the counter was last reset, each capsule comprising a first consumable foodstuff;
estimating, by the processor of the kitchen appliance or the remote replenishment server, where the container holder or capsule is absent, a quantity of a second consumable foodstuff used by the kitchen appliance during the brew cycle;
completing, by the kitchen appliance, the brewing cycle; and
transmitting, by the processor of the kitchen appliance or the remote replenishment server, a signal requesting replenishment of the first consumable foodstuff or the second consumable foodstuff, based on the counter or the estimated quantity.

2. The method of claim 1, wherein the first consumable foodstuff comprises a first packaging format, and wherein the second consumable foodstuff comprises a second packaging format.

3. The method of claim 1, wherein the first consumable foodstuff and the second consumable foodstuff are both coffee.

4. The method of claim 1, wherein estimating the quantity of the second consumable foodstuff used by the kitchen appliance during the brew cycle is based on a density of the second consumable foodstuff.

5. The method of claim 1, wherein estimating the quantity of the second consumable foodstuff used by the kitchen appliance during the brew cycle is based on a volume of the second consumable foodstuff.

6. The method of claim 1, wherein estimating the quantity of the second consumable foodstuff used by the kitchen appliance during the brew cycle is based on a mass of the second consumable foodstuff.

7. The method of claim 1, wherein the signal requesting replenishment is transmitted to the replenishment server remote from the kitchen appliance.

8. The method of claim 1, wherein the incrementing and the estimating are performed by the replenishment server remote from the kitchen appliance.

9. The method of claim 1, wherein estimating the quantity of the second consumable foodstuff used by the kitchen appliance during the brew cycle is based on data received from a computing device remote from the kitchen appliance.

10. The method of claim 9, wherein the data received from the computing device remote from the kitchen appliance is user preference data.

11. The method of claim 8, further comprising:
receiving, by the processor of the kitchen appliance or the remote replenishment server, an indication that replenishment has been cancelled by a user; and
updating a replenishment setting responsive to the indication.

\* \* \* \* \*